United States Patent [19]

Peterson et al.

[11] Patent Number: 5,113,733
[45] Date of Patent: May 19, 1992

[54] ADJUSTABLE ANGULAR SHEARING DEVICE

[75] Inventors: Arthur Peterson, Grandville; Jerry L. Kozminski, Grand Rapids, both of Mich.

[73] Assignee: Link, Inc., Grand Rapids, Mich.

[21] Appl. No.: 680,630

[22] Filed: Apr. 1, 1991

Related U.S. Application Data

[63] Continuation of Ser. No. 346,070, May 2, 1989, abandoned.

[51] Int. Cl.⁵ ............................................. B06D 1/06
[52] U.S. Cl. ......................................... 83/169; 83/214; 83/559; 83/588; 83/618; 83/682; 83/696
[58] Field of Search ............... 83/169, 559, 588, 618, 83/620, 694, 696, 698, 699, 682, 683, 39, 40, 213, 214, 695, 568, 582, 590, 417, 693; 72/337

[56] References Cited

U.S. PATENT DOCUMENTS

| | | |
|---|---|---|
| 716,876 | 12/1902 | Dunn . |
| 863,840 | 8/1907 | Freese . |
| 1,930,330 | 10/1933 | Wattleworth ............... 83/582 X |
| 2,078,569 | 4/1937 | Halstead ..................... 164/31 |
| 2,118,110 | 5/1938 | Rosenberg ................... 164/93 |
| 3,037,473 | 6/1962 | Whistler, Sr. et al. ......... 113/49 |
| 3,217,574 | 11/1965 | Nauta et al. ................ 83/568 X |
| 3,245,298 | 4/1966 | Bienick et al. .............. 83/215 |
| 3,958,482 | 5/1976 | Claesson ..................... 83/559 |
| 3,994,191 | 11/1976 | Pozsgay ..................... 83/559 X |
| 3,996,829 | 12/1976 | Tromponi ..................... 83/552 |
| 4,455,910 | 6/1984 | Kraft et al. ................. 83/169 X |
| 4,459,889 | 7/1984 | Holton et al. ............... 83/644 X |
| 4,481,848 | 11/1984 | Ikeda ......................... 83/693 |
| 4,483,227 | 11/1984 | Camisa ....................... 83/559 |
| 4,535,665 | 8/1985 | Fazis ......................... 83/917 X |
| 4,539,880 | 9/1985 | Barber et al. ............... 83/620 X |
| 4,729,273 | 3/1988 | Fazis ......................... 83/917 X |
| 4,739,683 | 4/1988 | Ogawa ....................... 83/559 X |
| 4,771,669 | 9/1988 | Bianchi ...................... 83/559 X |
| 4,958,545 | 9/1990 | Lenzotti ..................... 83/620 X |

*Primary Examiner*—Frank T. Yost
*Assistant Examiner*—Kenneth E. Peterson
*Attorney, Agent, or Firm*—Varnum, Riddering, Schmidt & Howlett

[57] ABSTRACT

An adjustable angular shearing device (10) in accordance with the invention is adapted to transversely shear sheet material from a continuous strip in a punch press. The device (10) has an upper punch (24) which coacts wtih a lower die (28) to shear sheet material passing between them. The punch (24) comprises a pair of members (32, 34) which coact with a pair of corresponding members (74, 76) on a lower die (28). The members rotate about aligned posts (26, 30) at the vertex of an angle. The rotation of the members about each respective post is selectively adjustable. A chevron-shaped part can be stamped from a continuous strip of sheet material by two successive stamps of the punch press.

25 Claims, 13 Drawing Sheets

FIG. 8

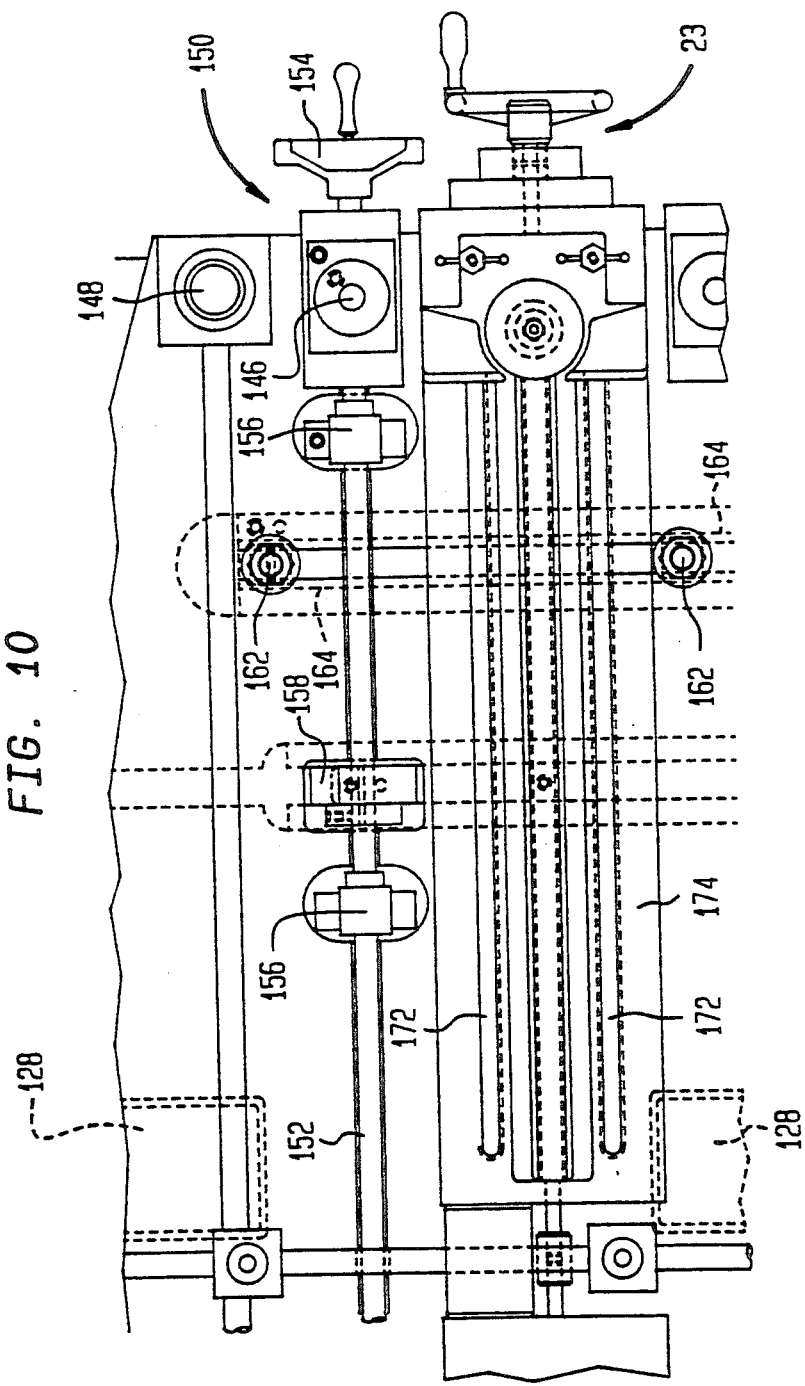

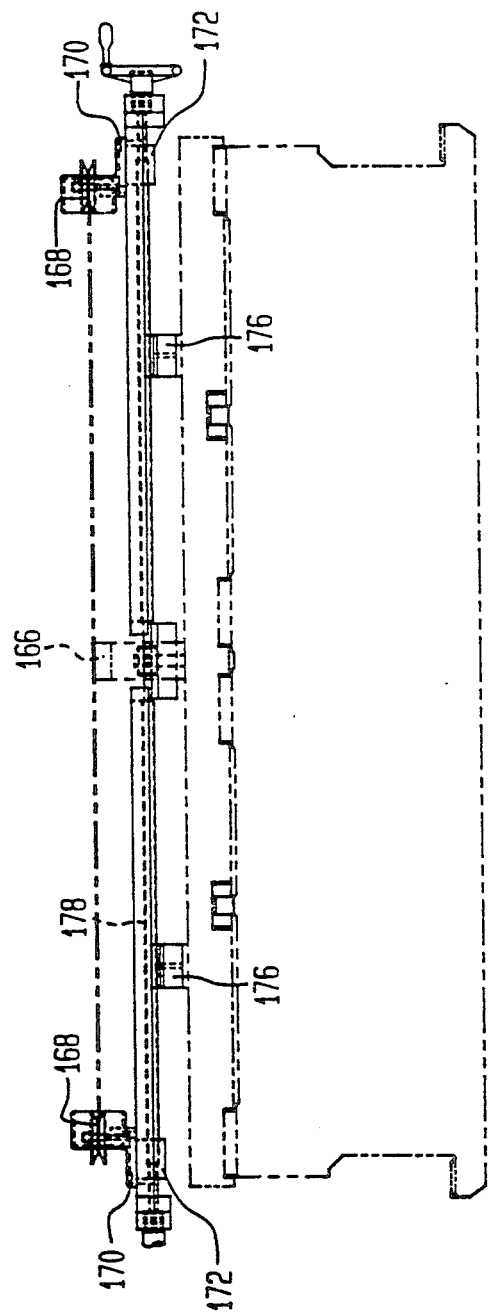

ADJUSTABLE ANGULAR SHEARING DEVICE

This is a continuation of application Ser. No. 07/346,070 filed on May 2, 1989 now abandoned

BACKGROUND OF THE INVENTION

1. Field of the Invention

This invention relates to adjustable dies for cutting sheet materials such as sheet metal, and more particularly to an adjustable die for transversely shearing sheet material from a continuous strip with angled cuts.

2. Description of the Prior Art

There are many instances where it becomes desirable to cut nonrectangular polygonal pieces of sheet material from a long strip. In the manufacture of large nonrectangular panels for automobiles or large appliances, for example, each piece can be formed by rotating a rectangular blank in a single fixed die set and making a series of individual cuts in the blank. Alternatively, each blank can be passed through a series of fixed die sets, each die set making a single cut in the blank.

Also, a particular shape approximating a polygonal pattern of the part actually required can be cut from a continuous strip of sheet material in a single step by a fixed die set predesigned and manufactured to cut the desired shape. A fixed die set of this type represents a considerable saving of time and labor over forming the pieces from rectangular blanks, but such equipment is very costly and occupies much space.

Adjustable dies for cutting nonrectangular shapes out of sheet material are known. Vamp throating dies, for example, have been long used in the manufacture of shoes for cutting curved patterns out of sheet material, primarily leather. Adjustable corner shears are also known for cutting notches, or obtuse t angled to acute angled corners from sheet metal.

U.S. Pat. No. 4,483,227 issued to Camisa on Nov. 20, 1984 discloses such a corner shearing machine. The device in Camisa has a pair of upper and a pair of lower knives which interact in the manner of scissors. To form an angular cutting edge, one knife of each pair is placed against the other in a V-shaped manner. Each pair is supported on knife carriers which pivot about a vertical axis. The apparatus provides for adjusting the angle between the cutting edges, wherein each upper knife is connected positively, without the shear stroke being impeded, to the corresponding lower knife by an unbiased engagement piece.

A disadvantage of these known devices is that they cannot cut a continuous strip of sheet material transversely from one edge to another. Furthermore, such devices cannot be used in a conventional punch press which can rapidly make consecutive cuts, and also generate large forces on each shear stroke.

It is desirable, then, to provide an adjustable die set for transversely shearing sheet material in a punch press, which can also make angled cuts at high speed, and can absorb the large forces generated by the punch press.

SUMMARY OF THE INVENTION

According to the invention, a shearing device is provided for rapidly shearing, in succession, polygonal pieces, each having more than four edges, from sheet material which passes through the device. The shearing device comprises an inlet area at one side of the device for feeding sheet material into the device, and an outlet area at another side of the device opposite from the inlet area for facilitating removal of cut pieces. The outlet area is generally aligned with the inlet area.

A lower plate on the device has first and second lower plate members. A first shaft is fixed to the lower plate and has a pivot axis, and at least one of the lower plate members is pivotally mounted to the shaft. Each lower plate member has a block which defines a cutting edge, and the block abuts the first shaft at its pivot axis.

The device also has an upper plate with first and second upper plate members. A second shaft is fixed to the upper plate and has a pivot axis coaxial with the first shaft. One of the first and second upper plate members is pivotally mounted to the second shaft for limited rotation, and each of the first and second upper plate members has a block which defines a cutting edge. The cutting edges on the upper plate and the cutting edges on the lower plate are disposed to cooperate with each other in shearing action.

Adjusting means are provided to adjust the cutting angle between the first and second plate members by causing rotation of one of them about the respective pivot axes. Also, biasing means are provided to bias the upper plate away from the lower plate. The device is adapted to be operated in a punch press whereby polygonal pieces, each having more than four edges, can be sheared rapidly and successively when sheet material is passed through the device.

In another aspect of the invention, the device has a guide means to connect the pivotable upper plate members and lower plate members to each other, whereby rotation of the first will automatically cause the second to be disposed to cooperate with the first without impeding the shearing action between the two when the cutting angle is adjusted.

Preferably, means are provided to lock the pivotable upper and lower plate members to the upper and lower plates, respectively, when the desired cutting angle is obtained. The locking means may be a bolt having a head slidably received in a T-slot in the upper or lower plate, and extending through the pivotable upper or lower plate member and secured to the member by a nut.

The device may also have stop means to limit the upward and downward movement of the upper plate with respect to the lower plate. Stop means preferably comprises a snubber shaft slidably received in a channel in each of the upper and lower plates, with a nut disposed at each end of the snubber shaft to abut the upper and lower plates. A bumper means can be provided to cushion the upward movement of the upper plate away from the lower plate. The bumper means preferably comprises a plurality of spring washers interposed between the upper plate and the nut on the end of the snubber shaft.

The biasing means preferably comprises a spring between the upper and lower plates and spaced away from the first and second upper plate members and the first and second lower plate members.

In another aspect of the invention, a wear pad is provided between the pivotable lower plate member and the lower plate. Pressurized air may be directed between the wear pad and the lower plate whereby the lower plate member will be lubricated to facilitate adjustment of the cutting angle.

In yet another aspect of the invention, each of the cutting edges is formed from a plurality of removable blocks mounted in registry on each of the first and second upper plate members and first and second lower plate members, with each block having at least one cutting surface.

The adjusting means preferably comprises a rotatable threaded shaft threaded into a nut pivotally mounted to one of the first and second upper plate and first and second lower plate members.

Means may also be provided to pierce a hole in the sheet material at a position corresponding to the vertex of the cutting angle.

The device thus constructed in accordance with the invention provides a means for absorbing the large forces generated by the upward and downward movement of the upper plate with respect to the lower plate in a conventional punch press. The die set may readily be placed in the press which forces the upper plate downwardly against the lower plate to cut sheet material interposed between the two plates.

The invention thus provides a structure for transversely shearing sheet material with angled cuts to make nonrectangular polygonal-shaped panels in a conventional punch press at high speed and with minimal wear.

BRIEF DESCRIPTION OF THE DRAWINGS

The invention will now be described with reference to the accompanying drawings in which:

FIG. 8 is a schematic view showing the air line circuit used in the device;

FIG. 10 is a plan view of a portion of the adjustable angular shearing device of FIG. 1, with parts cut away to illustrate the pierce hole die set and sheet guide mechanism;

FIG. 11 is an elevational view of the sheet guide mechanism;

DETAILED DESCRIPTION OF THE PREFERRED EMBODIMENT

Figure 1:
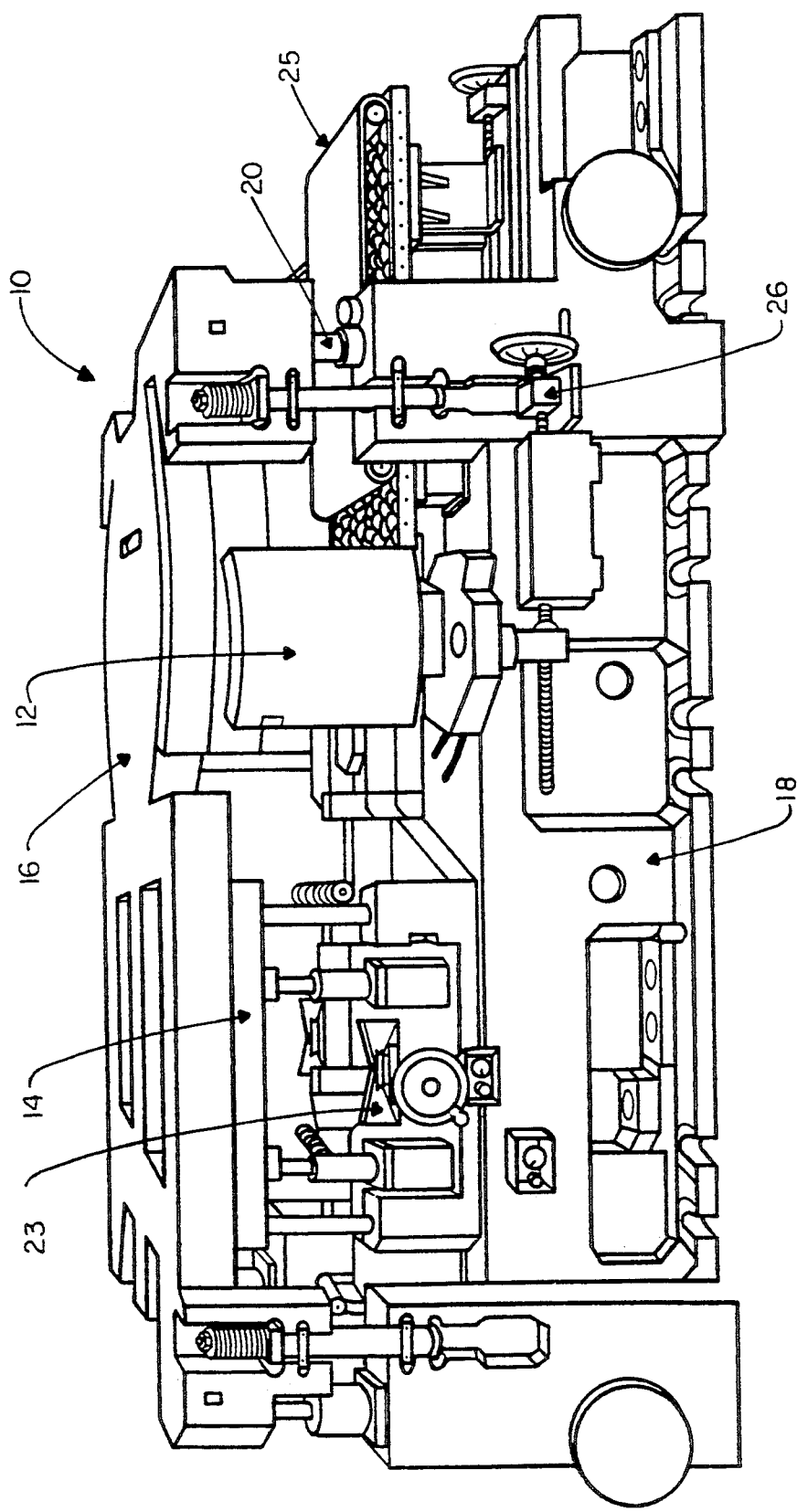
FIG. 1 is a side perspective view of an adjustable angular shearing device according to the invention.

An adjustable angular shearing device 10 according to the invention is shown generally in FIG. 1. The device 10 is adapted to be installed in a conventional punch press (not shown). The device 10 comprises generally a cutoff die set 12 positioned between an upper plate 16 and a lower plate 18. A separate, but optional pierce hole die set 14 may be positioned between the upper and lower plates 16, 18, respectively, in tandem with the cutoff die set 12. A vertical guide mechanism 20 maintains alignment between the upper and lower plates 16, 18, and an angular adjustment mechanism 22 permits the cutoff die set 12 to be adjustably positioned between the upper and lower plates to cut different angles in sheet material passing through it. A conventional stock guide mechanism 23 directs stock sheet material into the pierce hole die set 14 and then into the cutoff die set 12 where it may be cut by shearing into polygonal-shaped pieces as shown in FIGS. 12A-12D. Parts may be retrieved from an adjustable exit conveyor means 25.

Figure 2:
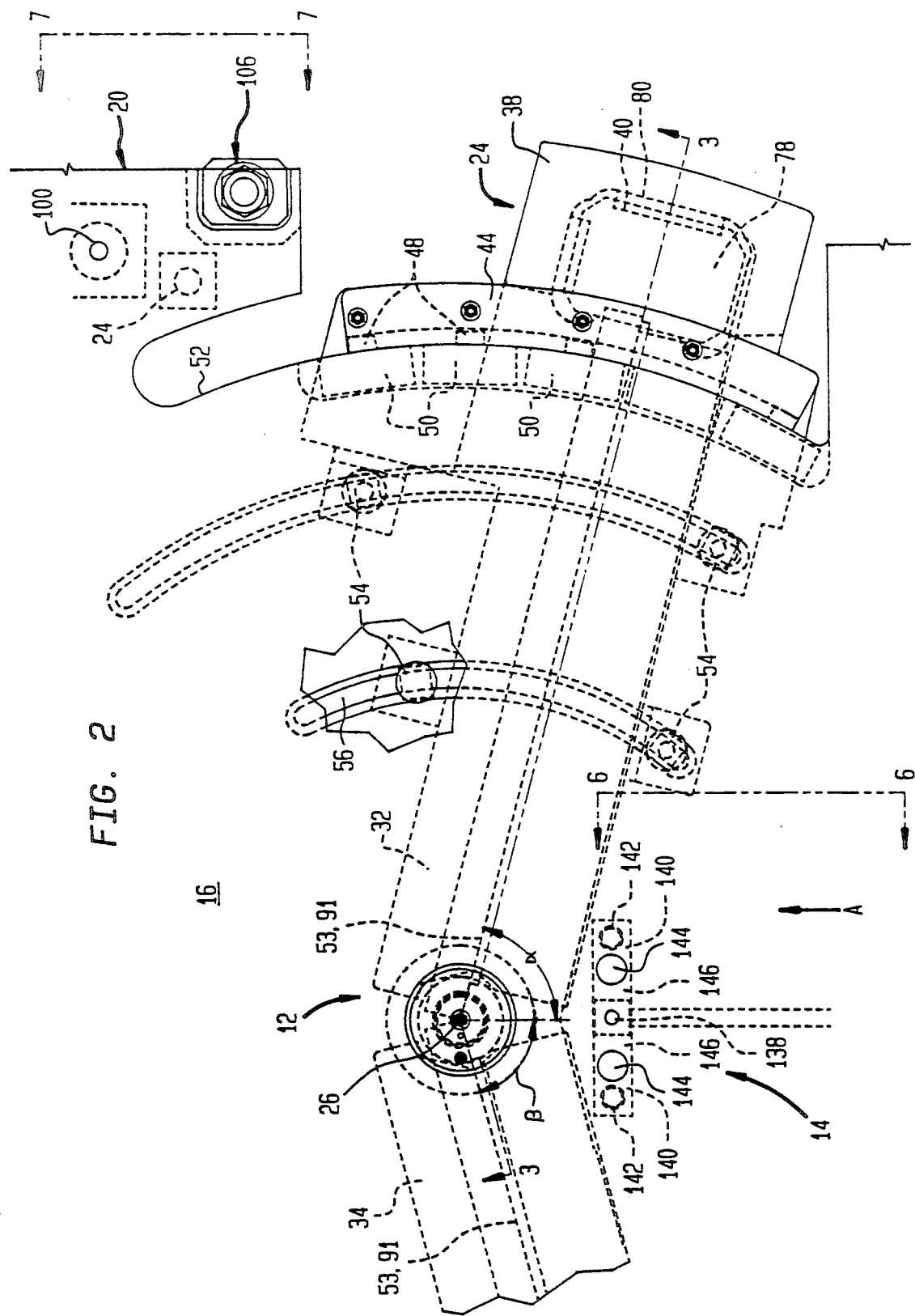
FIG. 2 is a top plan view of a portion of the adjustable angular shearing device of FIG. 1.
Figure 3:
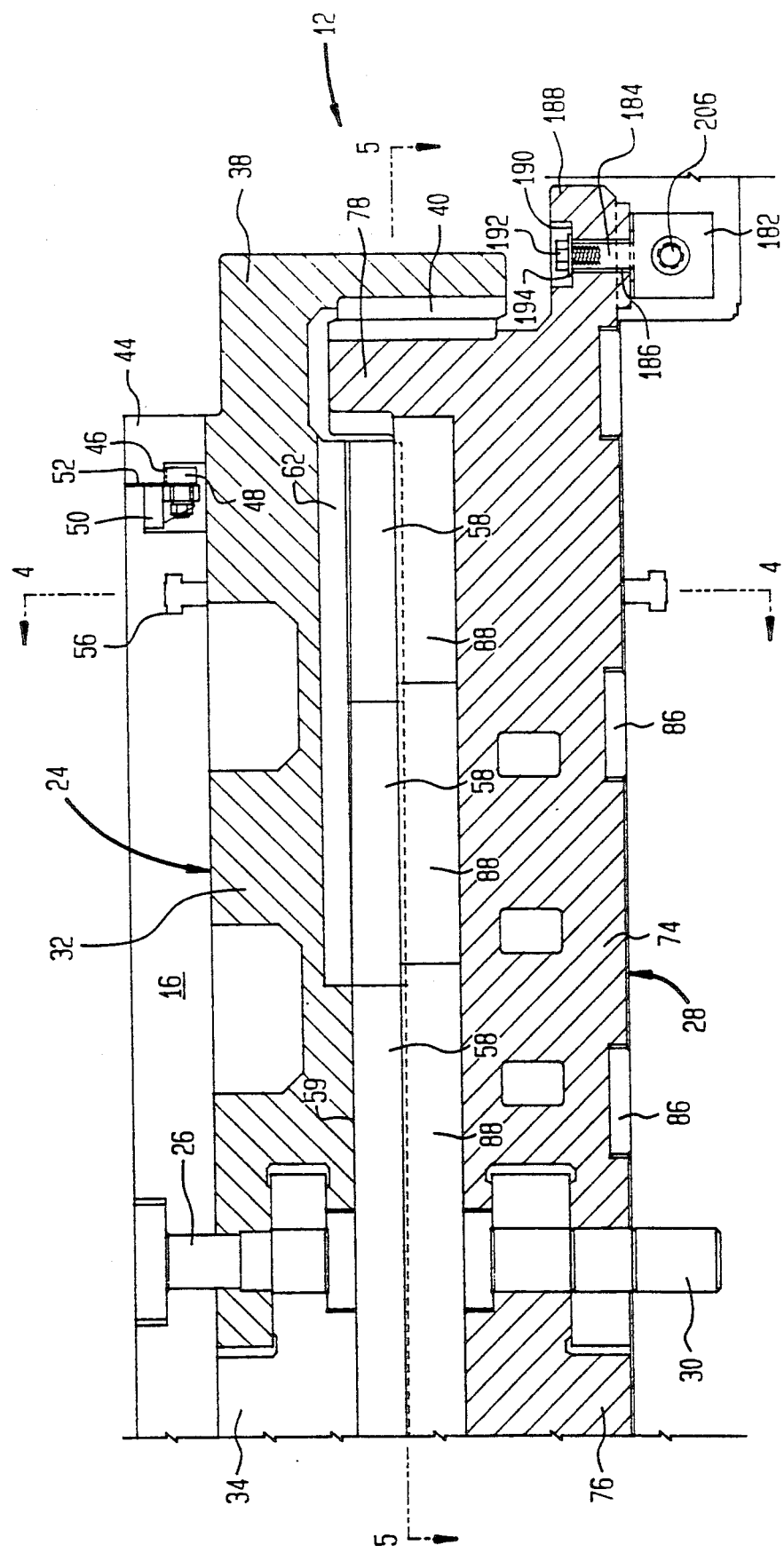
FIG. 3 is a sectional view taken along lines 3—3 of FIG. 2.

As shown in greater detail in FIGS. 2 and 3, the cutoff die set 12 comprises an upper punch 24 which is rotatable about an upper post 26, and which coacts with a lower die 28 rotatable about a lower post 30. The upper punch 24 comprises a right member 32 and a left member 34, each of which is hinged about the upper post 26 and retained by an upper post retainer pin 36. Each of the right and left members 32, 34, respectively, carries a downwardly facing female guide 38 at an outer end thereof adapted to receive a male guide 78 in a manner described hereinafter. Wear plates 40 are mounted on interior surfaces of the female guide 38. Each wear plate 40 may have graphite inserts (not shown) embedded in the wear surface to reduce friction.

Near the end of each of the right and left members 32, 34 on an upper surface thereof opposite the female guide 38 is mounted an arcuate keeper 44 which has a downwardly facing shoulder cam 46. The shoulder cam 46 is adapted to ride on five cam followers 48, each of which is a roller rotatably mounted to a mounting block 50 fixedly secured by any conventional means to a curved edge 52 of the upper plate 16. More or less cam followers 48 may be provided, but there should be a sufficient number to provide adequate support to the keeper 44 as each member 32, 34 rotates.

The arcuate shape of the keeper 44 conforms to the curvilinear edge 52, which shape follows a radius from the center point of the upper post 26. Thus, each member 32, 34 of the upper punch 24 is suspended from the upper plate 16, and independently freely rotatable about the upper post 26 through angles $\alpha$ and $\beta$, respectively, where $\alpha$ and $\beta$ are acute angles measured from a line through the axis of rotation and parallel to the direction of travel of sheet material through the device (as shown by arrow A in FIG. 2) to a line corresponding to a cutting edge 53 of each member 32 and 34, respectively. A pair of clamping bolts 54 is provided in each member 32, 34 to ride in one or more corresponding curvilinear T-slots 56 in the upper plate 16 and to secure each member 32, 34 to the upper plate 16 when the desired angles $\alpha$ and $\beta$ are obtained by use of the angular adjustment mechanism 22 as hereinafter described.

Figure 4:
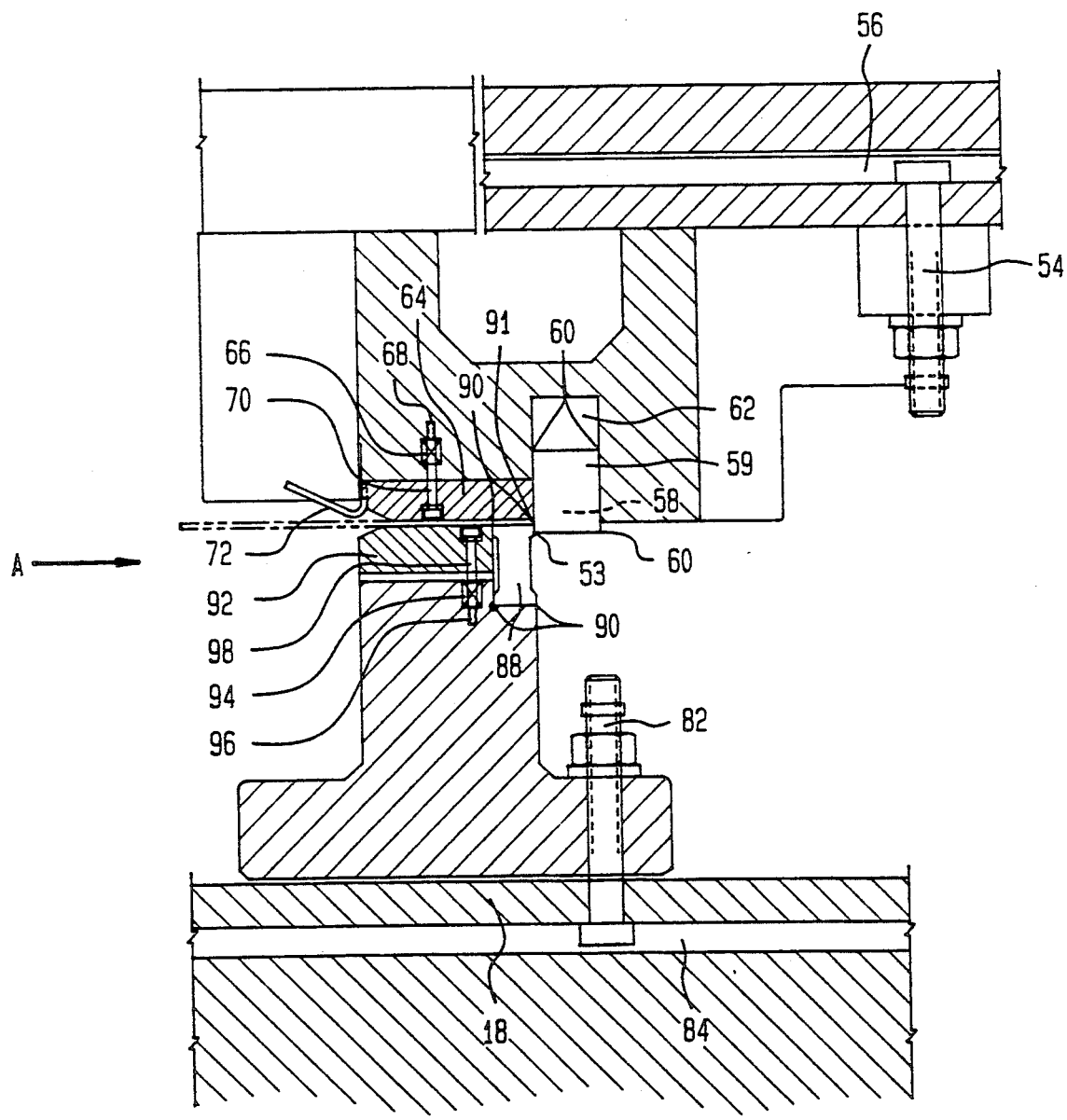
FIG. 4 is a sectional view taken along lines 4—4 of FIG. 3.

As shown in FIG. 3 in hidden view, a plurality of steel cutting blocks 58 (for example, three as illustrated) are mounted in registry in a seat 59 on each member 32, 34. Each cutting block 58 is provided with four separate hardened and sharpened edges 60. The cutting blocks 58 are aligned so that the cutting edge 53 extends radially from the axis of rotation through the centerline of the upper post 26. FIG. 4 shows a cross section of the cutting blocks 58. Advantageously, if the cutting edge 53 becomes dull or damaged, a clean, sharpened cutting edge 60 can be presented for use by simply removing a cutting block 58 from its seat 59 in the upper punch 24, and repositioning the block therein with a new sharpened edge 60 in the operative position. The cutting blocks 58 may be positioned in the seat 59 against a wedge plate 62 in order to facilitate a shearing action of the upper cutting edge 53 against a coacting lower cutting edge 91 on the lower die 28. The shearing action promotes cutting of the sheet material more cleanly and efficiently than a simple punching action.

Continuing with reference to FIG. 4, each of a plurality of hold-down pads 64 is mounted on a hold-down guide pin 68 for reciprocation in vertical bores in the upper punch 24. One or more springs 66 urges the hold-down pad 64 toward the lower extremity of its freedom of movement as determined by a retainer 70. During the downward movement of the upper punch 24, each hold-down pad 64 will first contact the sheet moving through the device in the direction of the arrow in FIG. 4. The sheet will then be held firmly in place as the upper punch 24 operates in conjunction with the lower die 28 to cut off a blank of steel stock. A material feed guide 72 is provided at the sheet entrance to the cutoff die set 12 to facilitate the guidance of the sheet material between the upper punch 24 and the lower die 28.

Figure 5:
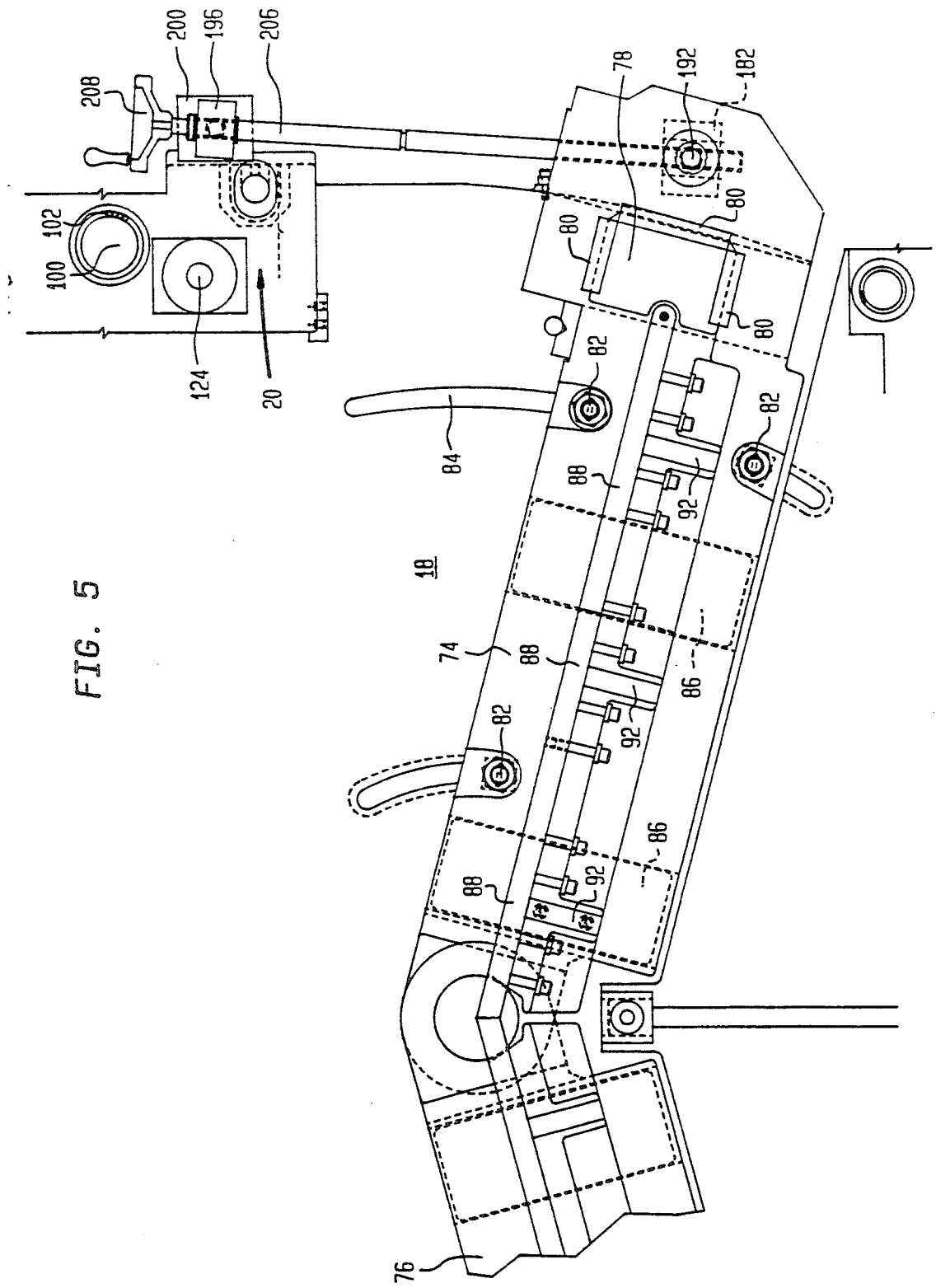
FIG. 5 is a sectional view taken along lines 5—5 of FIG. 3 particularly illustrating the lower die.

The lower die 28, as shown best in FIGS. 3 through 5, comprises a right member 74 and a left member 76 each of which is hinged to and pivotal about the lower post 30. Each member 74 and 76 is thus independently freely rotatable about the lower post 30. Near the outer end of each member 74, 76, and extending upwardly therefrom is the male guide 78 adapted to be received by the female guide 38 of the upper punch 24. Wear plates 80 are provided on three surfaces of the male guide 78 to facilitate smooth sliding movement within the female guide 38. The lower post 30 is aligned with the upper post 26 so that when the male guide 78 is received by the female guide 38, each right and left member 74, 76 of the lower die 28 will rotate in conjunction with the right and left member 32, 34, respectively, of the upper punch 24 and, accordingly, move through the corresponding variable desired angles $\alpha$ and $\beta$. The vertex of the shear angle therefore corresponds with the axis of rotation of the members. When the desired angles $\alpha$ and $\beta$ are obtained, a plurality of clamp-down bolts 82 extending through the lower die into T-slots 84 in the lower plate 18 will secure each member 74, 76 of the lower die 28 to the lower plate 18. During such adjustable movement, the weight of each lower member is carried on the lower plate 18 by two or more lubricated wear plates 86 to make the adjustment easier.

Each lower die member 74, 76 carries a plurality of steel cutting blocks 88, each having four sharpened edges 90 at each corner thereof to facilitate removal and replacement as described above with respect to the upper punch 24. Alignment of the sharpened edges 90 by mounting the blocks 88 in registry on the lower members 74, 76 forms a lower cutting edge 91. Lifters 92 are provided on the lower die members 74, 76 to keep the sheet material from rubbing on the sharpened edges 90 of the cutting blocks 88 as the sheet is moved through the die set 12 to the next cutting position. Each lifter 92 is mounted on a guide pin 96 for reciprocating movement within the vertical bores of the lower die members 74, 76. One or more lifter springs 94 urges each lifter toward the upper extremity of its freedom of movement as determined by a retainer 98. Each lifter may be provided with a graphite or similar nonabrasive surface.

It is important to maintain alignment of the cutting edges 53, 91 in the direction shown by arrow A, since the cleanness of the shearing action is determined by the accurate maintenance of the relationship of these cutting edges. Therefore, a vertical guide mechanism 20 is provided, in addition to the guiding action of the limited reciprocating movement of the male guide members 78 within the female guides 38.

The vertical guide mechanism 20 will now be described. Near to each corner of the upper plate 16 is fixed a pin 100 on a vertical axis which engages a bushing 102 received in a bore 104 of the lower plate 18. The primary function of the pins 100 is to maintain the alignment of the punch 24 and the die 28 in a direction parallel to the line of shear. A conventional gas spring 124 near each pin 100 serves to bias the upper plate 16 and the punch 24 carried thereby upwardly to an open position providing clearance between the steel cutting blocks 58, 88 to permit passage of the sheet material through the die set 12.

Each downward stroke of the punch 24 is accompanied by considerable force imparted by the press (not shown). Likewise, on the upward stroke of the press, the action of the springs 124 tends to maintain a considerable velocity of the punch 24. A snubber 106 is provided near to each vertical guide pin 100 to stop the upward and downward movement of the upper plate 16 and to absorb some of the energy of the punch at each limit of its travel. The snubber 106 comprises a snubber shaft 108 which carries a snubber nut 110 threaded on each end thereof. Each plate 16, 18 carries a vertical channel 114, 115 with a shoulder 116, 117 at each end thereof. The channels 114, 115 are aligned and adapted to receive the snubber shaft 108, with each nut 110 abutting its respective shoulder, 116, 117. The shaft 108 carries a plurality of spring washers 118 between the shoulder 116 on the upper plate 16 and the upper snubber nut 110 to form a bumper which will absorb energy at the upper extremity of the stroke of the punch 24. This bumper imparts a cushioning action to the upper movement, and prevents the punch 24 from being "thrown." A spacer 120 carried by the snubber shaft 108 between the upper and lower plates 16, 18 limits the downward travel of the upper plate 16 to absorb the downward stroke, and minimizes the impact of the upper members 32, 34 of the punch 24 on the lower members 74, 76 of the die 28. Lateral straps 122 are provided to secure the snubber shaft 108 in the channel 114.

Figure 7:
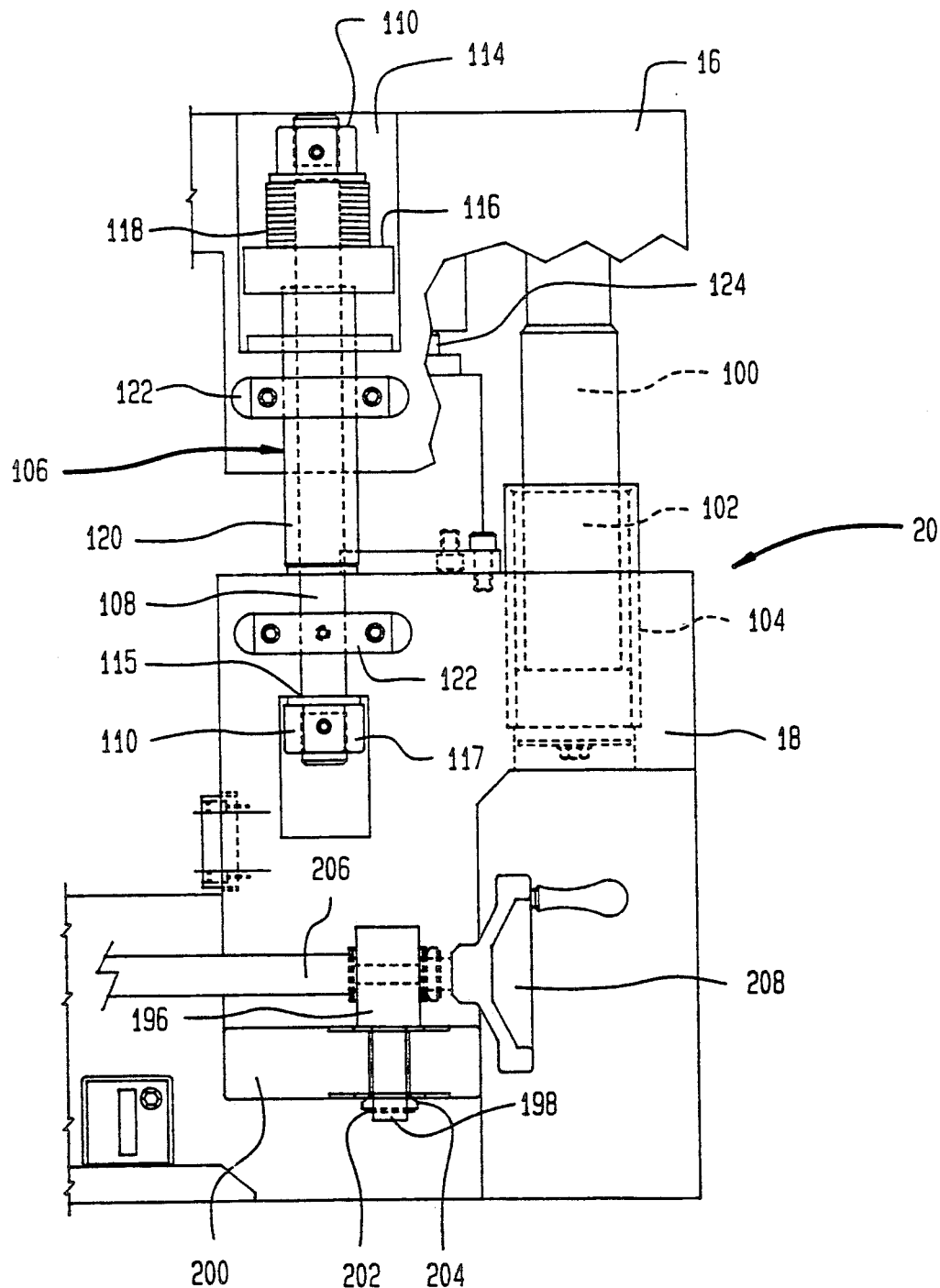
FIG. 7 is a sectional view taken along lines 7—7 of FIG. 2.

The angular adjustment of the respective members of the die set 12 is accomplished by the angular adjustment mechanism 22 which will now be described. As shown best in FIGS. 3, 5 and 7, a die nut 182 is pivotally attached to an extension 188 at an outward end of each lower die member 74, 76. A pivot member 184 integrally formed with the die nut 182 extends through an aperture 186 of the extension 188 and receives a bolt 192 and washer 194 on an end thereof. The washer 194 abuts an annular shoulder 190 surrounding the aperture 186. A base bearing member 196 with a depending stud 198 is secured to a base block extension 200 of the lower plate 18. A cotter pin 202 and washer 204 facilitate the pivotal movement of the base bearing member 196. A threaded rod 206 is journaled into the base bearing member 196 and threaded into the die nut 182. Rotation of the threaded rod 206 by handle 208 causes the die nut 182 to move toward or away from the base bearing member 196, which, in turn, causes the right or left member 74 or 76, respectively, of the lower die to rotate about the pivot point.

Figure 12A:
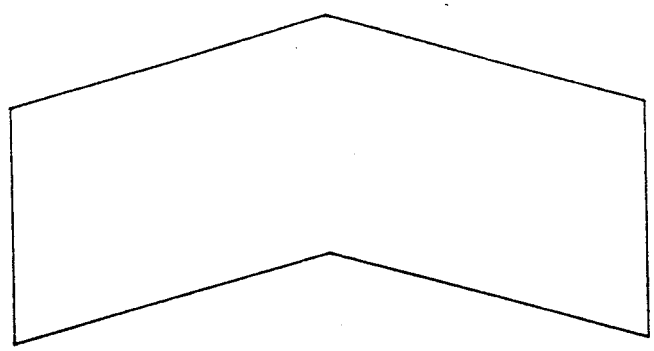
FIGS. 12A-12D illustrate shapes of parts that may be cut by the device.

A separate adjustment mechanism for each lower member 74, 76 provides independent adjustment of each member to obtain different shapes of cut material. When making a chevron-shaped piece as shown in FIG. 12A, each member 74, 76 is preferably rotatable through an angle ($\alpha$ or $\beta$) of between 75 degrees and 90 degrees which means that the maximum preferable angle of cut ($\alpha + \beta$) is between 150 degrees and 180 degrees. A smaller angle may fail to produce a clean cut at the hinge point on the centerlines of the upper and lower posts and further place undue wear on the inward cutting blocks 58, 88 at the hinge point.

Figure 12B:
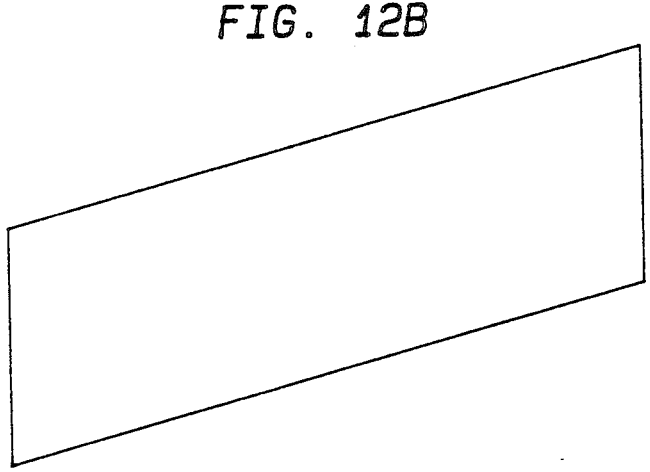
Figure 12C:
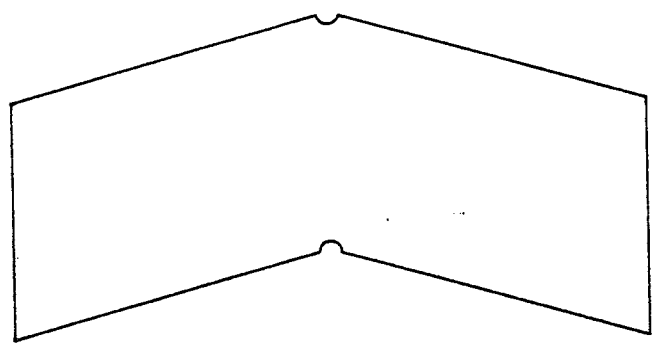

Different shapes may be obtained by different adjustments of the angles $\alpha$ and $\beta$. For example, where both $\alpha$ and $\beta$ equal 90 degrees, the cutting edges will be in a position such that the line of shear is perpendicular to the direction of movement of the sheet through the cutoff die, thus permitting a straight transverse cut in the manner of a conventional die. Further, it can readily be seen that where the members 32, 34, 74, 76 are positioned such that $\alpha + \beta = 180$ degrees but neither $\alpha$ nor $\beta = 90$ degrees, an angled straight cut can be made in the material. The shape of pieces cut in this configuration is shown in FIG. 12B.

Figure 8:
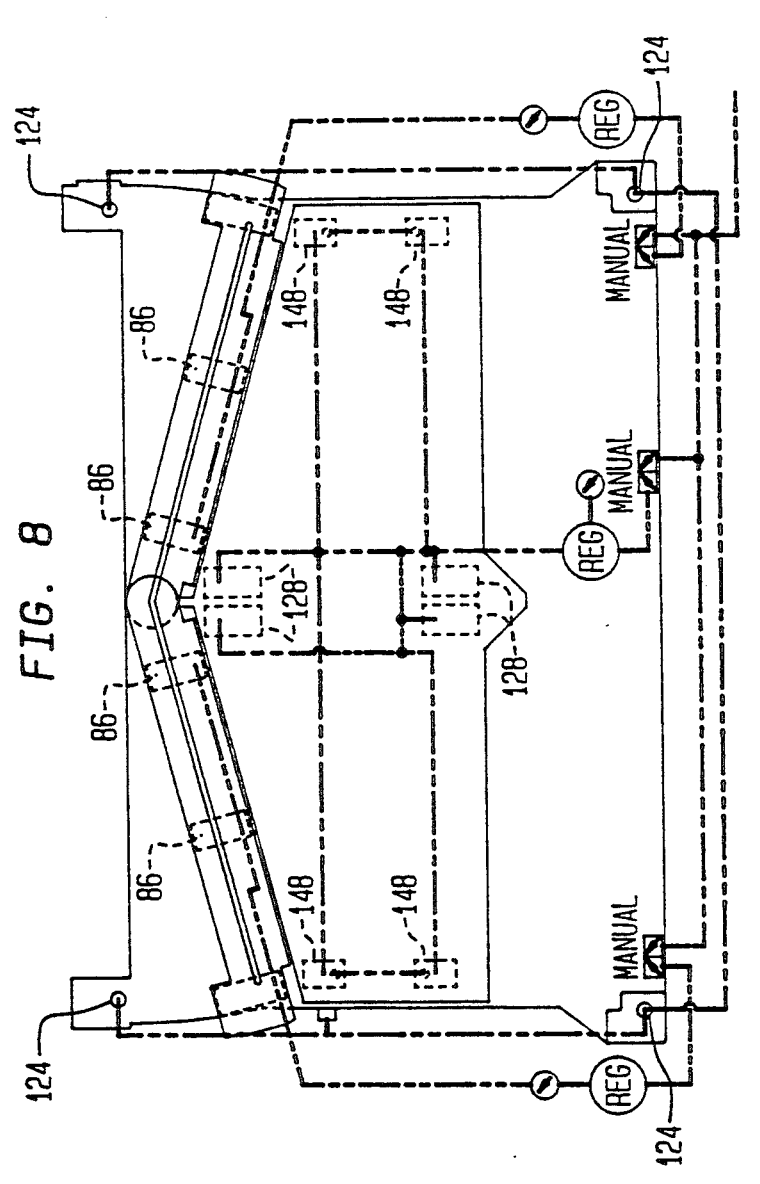
Figure 9:
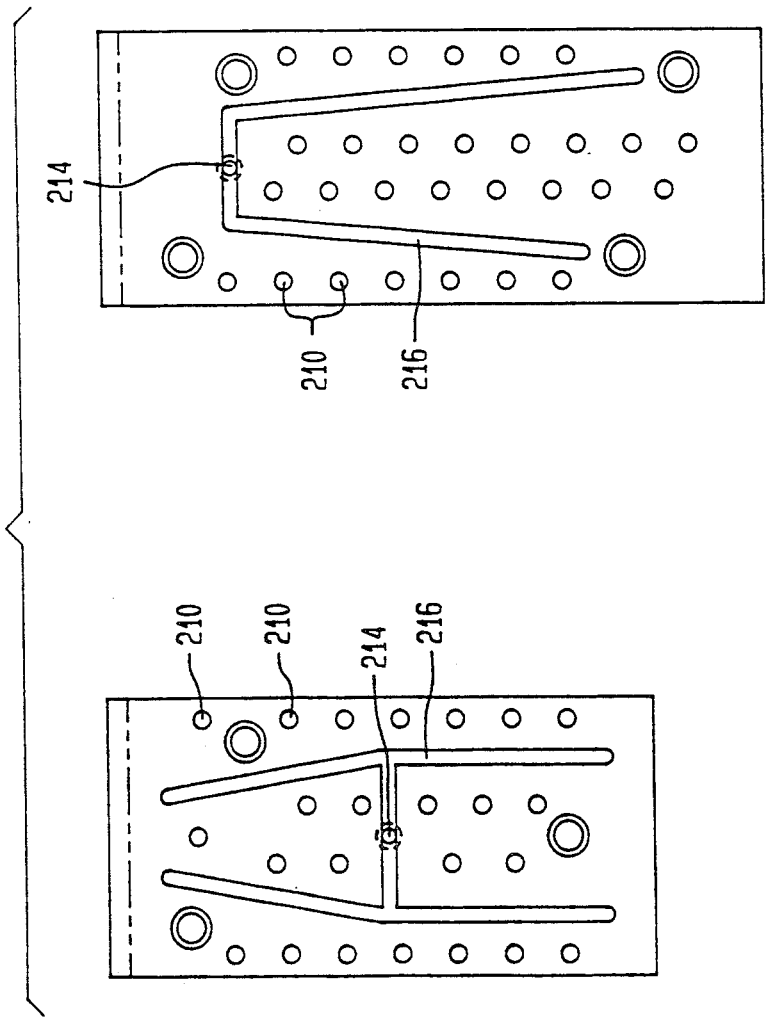
FIG. 9 is a bottom view of two wear plate configurations according to the invention.

The faces of the wear plates 86 which carry the lower die 28 during adjustment of the angle and prior to clamping with clamp-down bolts 82 are shown in FIG. 9. The plates are provided with graphite inserts 210 and with grooves 216. The grooves 216 communicate with an air aperture 214 and thence to a pressure hydraulic system (not shown). Application of air pressure to the air aperture 214 will have the effect of applying this pressure over a major portion of the surface of the plate 86 as a lubricant, and will float each member 74, 76 of the lower die 28 on this pressurized air lubricant. The weight of the lower die 28 is such that this arrangement is strongly recommended as a means to facilitate the angular adjustment of the cutoff die set 12. A schematic of a hydraulic system which may be used to activate the lubricant beneath the wear plates 86 and to operate the gas springs 124 is shown in FIG. 8.

Figure 6:
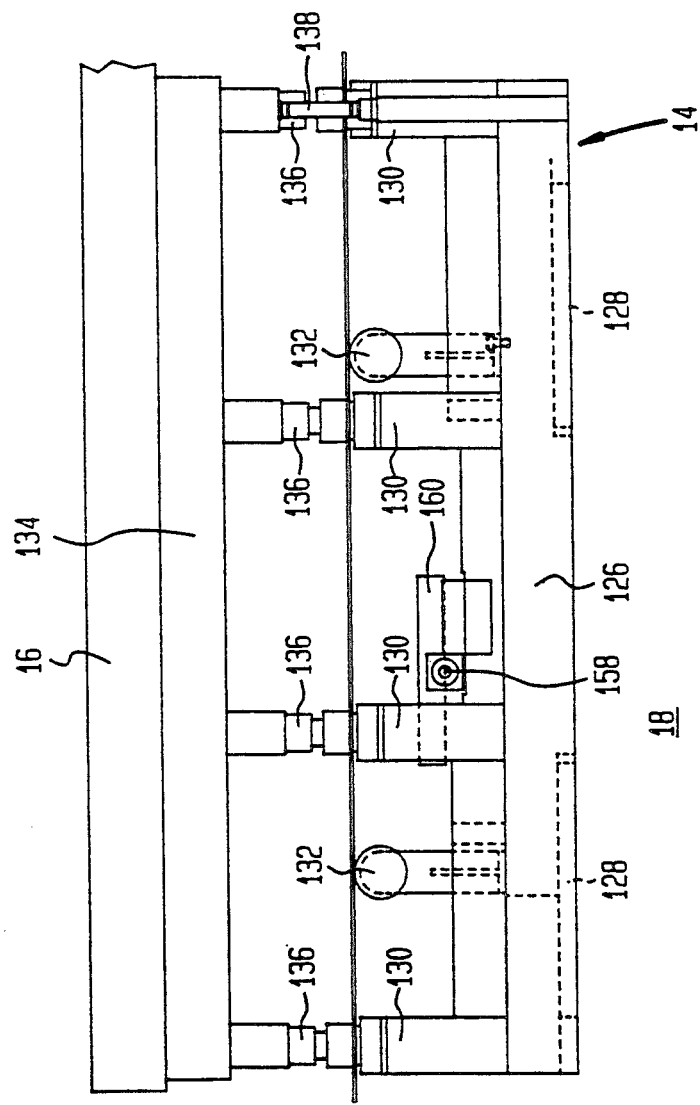
FIG. 6 is a sectional view taken along lines 6—6 of FIG. 2 illustrating the pierce hole die set.

The pierce hole die set 14 is best shown in FIGS. 2 and 6, and is a separate and independent die set from the cutoff die set 12. The pierce hole die set 14 is adapted to pierce a hole through the sheet material at a point corresponding to the vertex of the angles $\alpha$ and $\beta$ formed by the cut off die 12. Such a hole may be necessary because of the precise tolerances required to obtain a clean cut at the vertex and to minimize burr and accommodate any misalignment of the steel cutting blocks 58, 88 at the vertex. Nevertheless, where the precise tolerances are not needed, or can otherwise be maintained, the pierce hole die set 14 may not be needed, and therefore may be considered an optional addition to the adjustable angular shearing device 10.

The pierce hole die set 14 comprises a pierce hole die support plate 126 which rides on a plurality of wear plates 128 similar in size and configuration to the wear plates 86 of the lower cutoff die 28. A plurality of hole die members 130 (for example, four as illustrated) extend upwardly from the die support plate 126 and are spaced evenly apart. Rollers 132 interspersed between the die members 130 facilitate movement of the sheet material over the die members 130. Supported above the die support plate on, preferably, four nitrogen springs 48 and vertically guided by pierce hole guide pins and bushings 146 is a pierce hole punch support plate 134. Hole punch members 136 depend from the punch support plate 134 to correspond with the hole die members 130. A punch pin 138 can be inserted into a hole punch member 136 to be received into a corresponding hole die member 130 and accordingly punch a hole in sheet material passing between the respective punch member and die member. A hold-down pad 140 is mounted to and urged downwardly away from the hole punch support plate 134 by one or more hold-down springs 142 toward the lower extremity of its freedom of movement as determined by a retainer 144. The hold-down pad 140 is adapted to secure the sheet material on the die member 130 as the hole is punched by the punch pin 138 and to assist in retaining the sheet material in the downward position as the punch pin is retracted from the hole.

More than one corresponding die member 130 and punch member 136 are provided to accommodate different sizes of piece parts. This is so because both the cutoff die set 12 and pierce hole die set 14 are adapted to operate simultaneously in the same punch press. For example, as the cutoff die 12 shears the leading edge of the piece part from the strip of sheet material, the pierce hole die set 14 simultaneously pierces the sheet material with a hole at the vertex of the trailing edge of that piece part, which then becomes also the leading edge of the succeeding piece part.

As shown in FIGS. 6 and 10, a pierce hole die adjustment mechanism 150 independently is provided to adjust the pierce hole die set 14 to a position toward or away from the cutoff die set 12 to further accommodate different sizes of desired piece parts. In FIG. 10, a threaded shaft 152 carries a handle 154 for turning the shaft, and is journaled through bearing blocks 156. The torque in the shaft 152 may be too great for simple rotation of the handle 154 to overcome, so it may be that a simple nut (not shown) can be affixed to end of the shaft which can be received in a power driving mechanism or large wrench. A pinion gear 158 carried by the threaded shaft engages a rack 160 rigidly secured to the pierce hole die support plate 126. Rotation of the threaded shaft 152 causes the rack 160 to move in a horizontal direction toward or away from the cutoff die 12. When the desired position of the pierce hole die set 14 is obtained, clamp-down bolts 162 extending through the pierce hole die support plate 126 and into one or more T-slots 164 in the lower plate 18 will secure the pierce hole die support plate 126 to the lower plate 18.

An automatic sheet guide device 23 as shown in FIGS. 10 and 11 is conventional and includes means (not shown) operative to advance a sheet of stock material such as sheet metal, through the adjustable angular shearing device 10 in definite increments. The sheet guide device 23 may include one or more free rollers 166 and a pair of V-rollers 168 to guide the sheet material at the appropriate level and with the appropriate width through the adjustable angular shearing device 10. A riding block 170 carries each V-roller 168 along a slidable channel 172 to vary the width according to the particular sheet material to be utilized. The channel 172 is formed in a stock guide support 174 which, in turn, is mounted on brackets 176 to an appropriate base. A threaded rod 178 carries a handle 180 at one end to facilitate rotation. The threaded rod is threaded into the riding blocks 170 at each end. Reverse threads on each half of the threaded rod 178 will cause the riding blocks 170 to move toward or away from each other respectively, depending upon the direction of rotation of the handle 180 on the end of the rod 178.

In operation, the cutoff die set is adjusted to the desired configuration by loosening the clamping bolts 54, on both the upper punch 24 and the lower die 28. The hydraulic system is activated to introduce pressurized air to the surfaces of the wear plates 86 and "float" the lower die 28 on a cushion of air. Rotating the handle 208 of the angular adjustment mechanism 22 on each lower die member 74, 76 will move each upper punch member 32, 34 and each lower die member to a desired angle α, β. The air flow is then stopped and the members secured to the upper and lower plates 16, 18, respectively, by the clamping bolts 54, 82. A punch pin 138 is placed in the appropriate hole punch member 136 to correspond roughly to the desired dimensions of the piece parts, and the pierce hole die set 14 is more finely adjusted to the proper position by the pierce hole die adjustment mechanism 150. When the die sets 12, 14 are secured, sheet material such as sheet metal, from a continuous roll is passed through the sheet guide mechanism 23 and fed between the hole punch members 136 and the hole die members 130 of the pierce hole die set 14, and then between the upper punch 24 and lower die 28 of the cutoff die set 12. Reciprocating movement of the punch press will simultaneously shear an angled cut transversely of the strip and pierce a hole at a point corresponding to the vertex of the next succeeding transverse angle cut as the strip is incrementally passed through the device 10.

Figure 14:
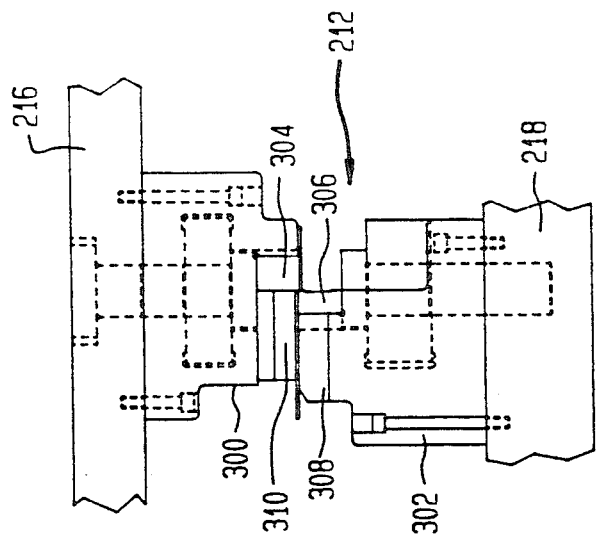
FIG. 14 is a sectional view taken along lines 14—14 of FIG. 13.
Figure 12D:
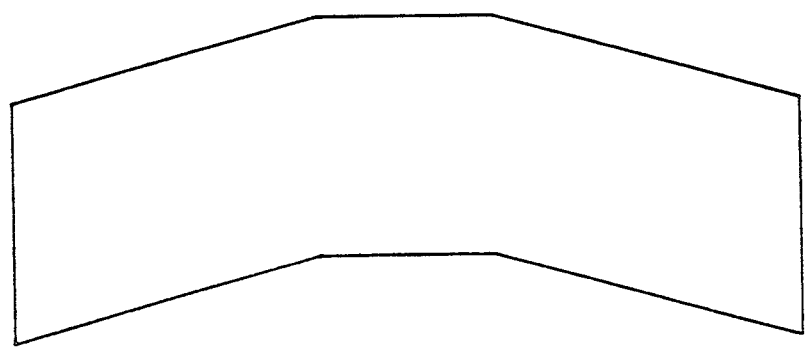
Figure 13:
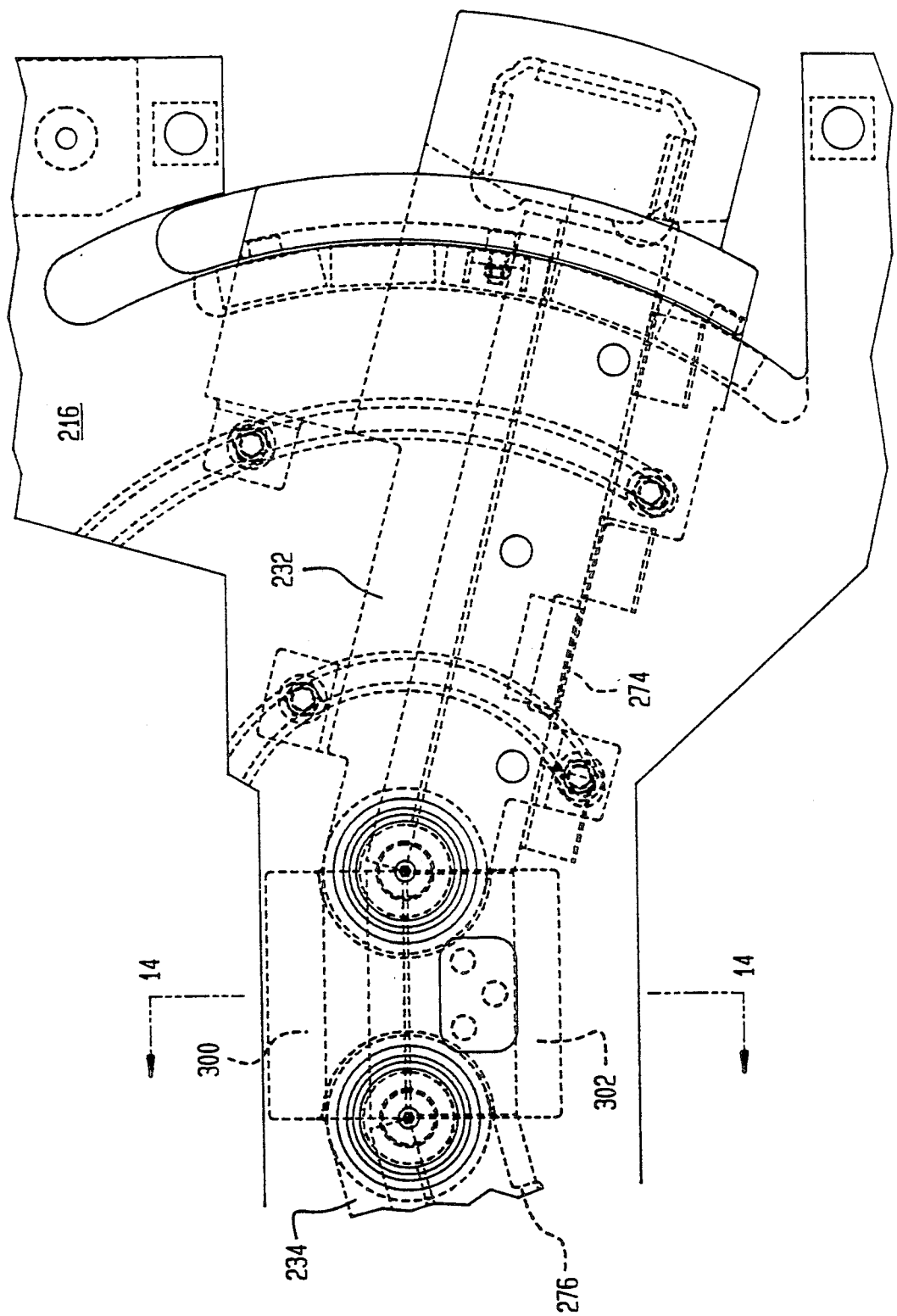
FIG. 13 is a plan view of pertinent portions of a second embodiment of an adjustable angular shearing device, in accordance with the invention.

A second embodiment of the invention as shown in FIGS. 13 and 14 provides for a multiple angled transverse shear in sheet material. The second embodiment comprises a cutoff die set 212 positioned between an upper plate 216 and a lower plate 218. As in the first embodiment, the die set comprises an upper punch and a lower die which coact to transversely shear stock sheet material passing between them. It can be readily seen in the second embodiment that each right and left member 232 and 234 of the upper punch 224 is independently hinged to a fixed central member 300 rigidly secured to the upper plate 216. Likewise, each right and left member 274 and 276, respectively, of the lower die 228 is independently hinged to a fixed lower center member 302 rigidly secured to the lower plate. As shown in FIG. 14, each center member 300 mounts upper and lower cutting blocks 304, 306, lifters 308 and hold-down pads 310 in the manner hereinabove described with respect to the adjustable members in the first embodiment. Adjustment of the respective right and left members 274, 276 is afforded in the same manner as described above with respect to the first embodiment. The resulting shape of a part cut by the second embodiment is shown in FIG. 12D.

A pierce hole die set (not shown) adapted to punch holes in the sheet material corresponding to the vertices of the angles between the adjustable members 232, 234, 274, 276 and the center members 300, 302 may be employed if necessary.

The particular embodiments of the present invention which have been illustrated and discussed herein are for illustrative purposes only, and are not to be considered as limiting. It will be understood that reasonable variation and modification of the invention are possible within the scope of the foregoing disclosure and drawings, without departing from the spirit of the invention, as defined in the accompanying claims.

The embodiments of the invention in which an exclusive property or privilege is claimed are defined as follows:

1. A shearing device for rapidly shearing in succession, polygonal pieces, each having more than four edges, from sheet material which passes through said device, said shearing device comprising:

an inlet area at one side of the device for feeding sheet material into said device;

an outlet area at another side of the device opposite from said one side for facilitating the removal of polygonal pieces, said outlet area being generally aligned with said inlet area;

a lower plate having a first lower plate member and a second lower plate member;

a first shaft fixed to said lower plate and having a pivot axis, at least one of said first and second lower plate members being pivotally mounted to said first shaft for limited rotation thereabout to form a cutting angle relative to the other of said lower plate members, and each of said lower plate members having a block which defines a cutting edge, the block abutting the first shaft at its pivot axis;

an upper plate having a first upper plate member and a second upper plate member;

a second shaft fixed to said upper plate and having a pivot axis coaxial with said first shaft, at least one of said first and second upper plate members being pivotally mounted to said second shaft for limited rotation thereabout, and each of said first and second upper plate members having a block which defines a cutting edge, each block abutting the second shaft at its pivot axis, the cutting edges being disposed to cooperate with each of said first and second lower plate member cutting edges, respectively, in shearing action by moving said upper plate downwardly and upwardly with respect to said lower plate;

adjusting means to adjust said cutting angle by causing rotation of said at least one of said first and second plate members and first and second upper plate members; and biasing means to bias said upper plate away from said lower plate whereby polygonal pieces, each having more than four edges can be sheared rapidly and successively when sheet material is passed through the device and the device is operated in a punch press.

2. A shearing device according to claim 1 and further comprising guide means to connect at least one of said first and second upper plate members to at least one of said first and second lower plate members wherein said at least one of said first and second upper plate members will be automatically disposed to cooperate with said at least one of said first and second lower plate members without impeding said shearing action when said cutting angle is adjusted.

3. A shearing device according to claim 2 and further comprising means to lock said at least one of said first and second upper plate members and said at least one of said first and second lower plate members to said upper and lower plates, respectively, when the desired cutting angle is obtained.

4. A shearing device according to claim 3 wherein said locking means comprises at least one bolt extending through said at least one of said first and second upper plate members and said first and second lower plate members, having a head slidably received in a T-slot in said upper and lower plates, and a nut to secure said bolt to said at least one of said first and second upper plate members and first and second lower plate members.

5. A shearing device according to claim 2 and further comprising stop means to limit the upward and downward movement of said upper plate.

6. A shearing device according to claim 5 wherein said stop means comprises a snubber shaft slidably received in a channel in each of said upper and lower plates, and a nut disposed at each end of said snubber shaft to abut said upper and lower plates.

7. A shearing device according to claim 6 and further comprising a bumper means to cushion the upward movement of said upper plate away from said lower plate at the limit of said upward movement.

8. A shearing device according to claim 7 wherein said bumper means comprises a plurality of spring washers interposed between said upper plate and said nut.

9. A shearing device according to claim 2 wherein said biasing means comprises a spring between said upper and lower plates and spaced away from said first and second upper plate members and said first and second lower plate members.

10. A shearing device according to claim 2 wherein said at least one lower plate member carries a wear pad between said at least one lower plate member and said lower plate.

11. A shearing device according to claim 10 wherein pressurized air is directed between said wear pad and said lower plate whereby said at least one lower plate member will be lubricated to facilitate adjustment of said cutting angle.

12. A shearing device according to claim 2 wherein each of said cutting edges is formed from a plurality of removable blocks mounted in registry on each of said first and second upper plate members and first and second lower plate members, each of said blocks having at least one cutting surface.

13. A shearing device according to claim 2 wherein said adjusting means comprises a rotatable threaded shaft threaded into a nut pivotably mounted to said at least one of said first and second upper plate and first and second lower plate members.

14. A shearing device according to claim 1 wherein said adjusting means comprises a rotatable threaded shaft threaded into a nut pivotably mounted to said at least one of said first and second upper plate and first and second lower plate members.

15. A shearing device according to claim 1 and further comprising means to lock said at least one of said first and second upper plate members and said at least one of said first and second lower plate members to said upper and lower plates, respectively, when the desired cutting angle is obtained.

16. A shearing device according to claim 15 wherein said locking means comprises at least one bolt extending through said at least one of said first and second upper plate members and said first and second lower plate members, having a head slidably received in a T-slot in said upper and lower plates, and a nut to secure said bolt to said at least one of said first and second upper plate members and first and second lower plate members.

17. A shearing device according to claim 1 and further comprising stop means to limit the upward and downward movement of said upper plate.

18. A shearing device according to claim 17 wherein said stop means comprises a snubber shaft slidably received in a channel in each of said upper and lower plates, and a nut disposed at each end of said snubber shaft to abut said upper and lower plates.

19. A shearing device according to claim 18 and further comprising a bumper means to cushion the upward movement of said upper plate away from said lower plate at the limit of said upward movement.

20. A shearing device according to claim 19 wherein said bumper means comprises a plurality of spring washers interposed between said upper plate and said nut.

21. A shearing device according to claim 1 wherein said biasing means comprises a spring between said upper and lower plates and spaced away from said first and second upper plate members and said first and second lower plate members.

22. A shearing device according to claim 1 wherein said at least one lower plate member carries a wear pad between said at least one lower plate member and said lower plate.

23. A shearing device according to claim 22 wherein pressurized air is directed between said wear pad and said lower plate whereby said at least one lower plate member will be lubricated to facilitate adjustment of said cutting angle.

24. A shearing device according to claim 1 wherein each of said cutting edges is formed from a plurality of removable blocks mounted in registry on each of said first and second upper plate members and first and second lower plate members, each of said blocks having at least one cutting surface.

25. In a shearing device for rapidly shearing in succession polygonal pieces from sheet material passing through said shearing device, said device comprising an inlet area at one side of the device for feeding sheet material into said device, an outlet area on another side of said device opposite said one side for facilitating the removal of polygonal pieces, said outlet area being generally aligned with said inlet area, a lower plate and an upper plate between the inlet area and the outlet area, said upper plate spaced from the lower plate and mounted generally parallel thereto for reciprocating movement relative to the lower plate, said lower plate carrying a pair of members each having a block which defines a cutting edge, and said upper plate carrying a pair of members each having a block which defines a cutting edge disposed to cooperate with each of the lower plate member cutting edges, respectively, in shearing action when the upper plate reciprocates relative to the lower plate, the improvement comprising:

a first pivot defining a pivot axis on the upper plate to which both of the upper plate members are mounted, and about which one of the upper plate members rotates relative to the other; and a second pivot defining a pivot axis on the lower plate spaced from and coaxial with the first pivot and to which both of the lower plate members are mounted, and about which one of the lower plate members rotates relative to the other of the lower plate members, the blocks abutting the respective first and second pivots at the respective pivot axes whereby sheet material can be sheared from one edge to an opposing edge along two lines which intersect at a point intermediate the opposing edges of the sheet material when the upper plate reciprocates relative to the lower plate and whereby upon successive reciprocation of the upper plate relative to the lower plate, polygonal pieces, each having more than four edges, can be formed.

* * * * *

UNITED STATES PATENT AND TRADEMARK OFFICE
CERTIFICATE OF CORRECTION

PATENT NO. : 5,113,733

DATED : May 19, 1992

INVENTOR(S) : ARTHUR PETERSON ET AL

It is certified that error appears in the above-identified patent and that said Letters Patent is hereby corrected as shown below:

Col. 10, Claim 1, Line 42, before "plate members" insert
    --lower--.

Signed and Sealed this

Third Day of August, 1993

Attest:

MICHAEL K. KIRK

Attesting Officer

Acting Commissioner of Patents and Trademarks